Jan. 26, 1965 L. SCOTT 3,167,654
DOUBLE PULSE RECOGNITION CIRCUIT
Filed April 29, 1963
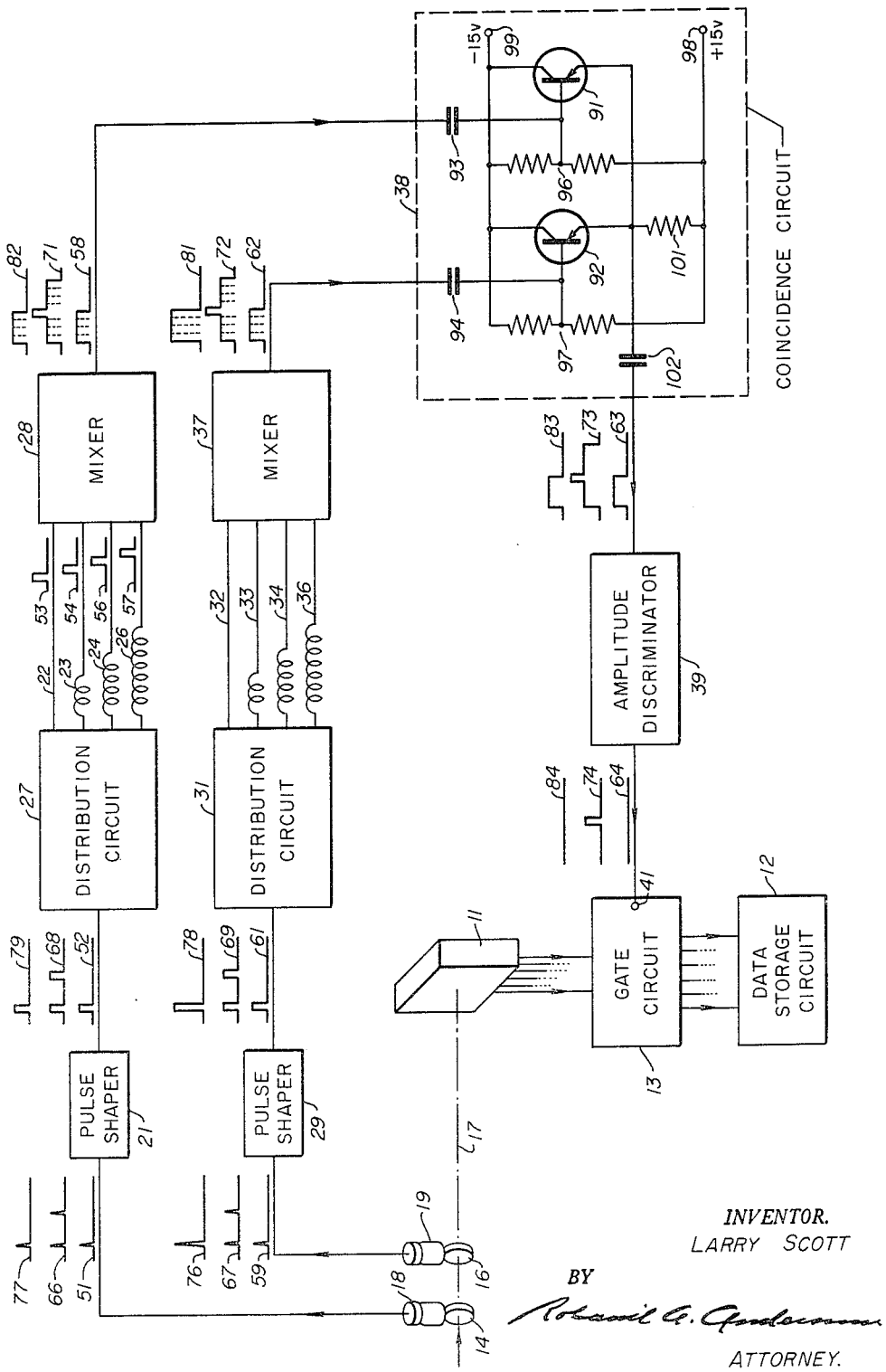
INVENTOR.
LARRY SCOTT
BY
ATTORNEY.

3,167,654
DOUBLE PULSE RECOGNITION CIRCUIT
Larry Scott, Paris, France, assignor to the United States of America as represented by the United States Atomic Energy Commission
Filed Apr. 29, 1963, Ser. No. 276,671
8 Claims. (Cl. 250—71.5)

The present invention relates generally to electronic pulse circuitry and more particularly to a radiation detector output circuit for passing a signal originated by an isolated charged particle while suppressing signals which are too closely timed to be separately assimilated by subsequent counting circuitry.

In a commonly used class of charged particle detectors, a particle enters the detector from some external source and passes through a scintillation material in which a light flash, produced as a result of the particle, is detected by a photomultiplier tube. The photomultiplier tube produces a very short electrical pulse as a result of such light flash, the pulse then being analyzed in various ways to obtain information about the charged particle. In more complex particle detectors, many scintillators and photomultiplier tubes must be provided to obtain the desired information. In a complex nuclear particle detection system such as a scattering detector, it is necessary that the data from only one charged particle be processed at a time. The data from the various particle detectors must be received and assimilated by data analyzing and storage circuitry for a short period of time following the detection of each particle. If two particles enter such a detection system at about the same time, the second particle will mix new data with the data obtained as a result of the first particle, causing inaccurate recording of the data from both particles. Therefore, it is desirable that information from both particles be eliminated if a second particle is detected within some minimum time interval after a first particle is detected, such time interval being equal to the assimilation time of the data analyzing and storage circuitry.

In the usual prior system, discrimination against the simultaneous counting of data from two nearly coincident particles is accomplished by adding the amplitudes of two pulses which are each produced by one of the two incoming particles. The resultant of the summation is passed through an amplitude detector which inactivates the data storage circuitry whenever a high amplitude pulse, which is presumably the summation of two concurrent input pulses, is received. However, such amplitude detecting method is unsatisfactory from the viewpoint that some valid single pulses have amplitudes twice the probable value for a single pulse owing to the statistical response characteristics of scintillation material. The conventional amplitude detector will mistakenly reject such pulses.

The present invention provides a means for overcoming the disadvantages of the previous systems so that unusually large but valid pulses are not rejected. In accordance with the invention a pair of particle detectors are disposed in a telescope arrangement so that charged particles must pass through two preliminary detectors prior to reaching the principal detection apparatus. The data from such pair of detectors are used for determining if information from the principal detection apparatus is valid, that is, whether information from such apparatus is from a single particle or is invalid information from more than one particle.

When a charged particle passes through the two preliminary detectors, a pair of simultaneous electrical pulses are created by the two detectors, each pulse then being separately applied to one of two identical pulse channels.

In each channel there is a pulse shaper which provides a rectangular pulse having an amplitude equal to the amplitude of the input pulse and a standard length, typically a few nanoseconds. The length of the pulse must be considerably extended without change of amplitude and without degradation of the fast rise and fall times obtained in the pulse shaper. To accomplish such lengthening, a novel circuit is provided in which the output of the pulse shaper is connected to a plurality of parallel delay lines. The first delay line generally has zero delay, the second has a delay approximately equal to the length of the pulse shaper output pulse and the remaining delay lines have progressively longer delays. The outputs of the delay lines are then combined and a continuous composite pulse comprised of the sequential pulses from the outputs of all the delay lines is formed. Such composite pulse has the rapid rise and fall times, and the amplitude of the pulse shaper output pulse. Simultaneously the pulse from the other particle detector has been similarly treated in the second pulse channel, which is similar to the first pulse channel. The two composite rectangular pulses are applied to the two input terminals of a "long tail pair" type of coincidence circuit which provides an output signal having an amplitude only as great as that of the lowest of the two input signals.

Thus, as discussed above, each individual charged particle causes simultaneous input pulses to be created in two separate preliminary particle detectors, the pulses from each detector passing through separate channels to the inputs of the coincidence circuit. Since the amplitude of the output pulse from the coincidence circuit is equal to the amplitude of the lowest of the two input pulses, if one of the two input pulses has significantly greater than normal amplitude, owing to the amplitude variability of the particle detectors output, the amplitude of the coincidence circuit output is not affected. It is statistically improbable that the input pulses in both channels will have higher than normal amplitudes at the same time. Thus the output signals from the coincidence circuit initiated by single particles will tend to maintain an essentially constant signal level. If the output signal from the coincidence circuit does not exceed a preselected threshold level in an amplitude detector, such level being set slightly above the normal coincidence circuit signal output level, the data storage circuit receives and stores data from the principal detection apparatus in a normal manner.

If two particles in rapid sequence pass through the particle detectors, two pulses are created in each channel. The rectangular composite pulses from the delay lines will overlap, and the amplitudes of the overlapping portions of the rectangular pulses are added. The resultant output signal from the coincidence circuit is approximately doubled in amplitude and thus exceeds the threshold level of the amplitude detector, thus preventing the data from the principal detection apparatus from being recorded. Thus the storage of erroneous data is avoided.

Therefore it is an object of the present invention to provide means for improving the reliability of data from charged particle detection apparatus.

It is another object of the present invention to provide an improved means for avoiding inaccurate recording of nuclear data due to statistical variations in the response characteristic of scintillators.

It is another object of the present invention to provide a new means for inactivating data storage circuitry when two or more charged particles enter a detector within a minimum time interval.

It is still another object of the present invention to provide pulse input circuitry in a charge particle detector that can distinguish a single nuclear particle which produces an unusually high amplitude input pulse from two nearly concurrent particles.

It is another object of the invention to provide a new delay line means for lengthening the duration of a randomly occurring pulse while maintaining the rapid rise and fall times, and amplitude, of the original pulse.

The invention will be better understood by reference to the accompanying schematic circuit drawing of a preferred embodiment.

Referring now to the drawing there is shown a scattering chamber 11, including associated data processing circuitry, of a class typically utilized for analyzing the characteristics of nuclear particles. Chamber 11 may have any of a variety of configurations well known to those skilled in the art and typically will have a plurality of output channels which connect with a pulse recording means 12. As heretofore discussed, the recording means 12 is capable of handling, during a short period, only pulses which originate from a single charged particle entering the chamber 11. Accordingly a normally closed gate circuit 13 is connected between chamber 11 and recording means 12 to prevent pulses which arise from nearly concurrent particles from reaching recording means 12. It is necessary that the data from the chamber 11 be delayed for a short time period before being applied to the storage circuit so that the present invention may have time to make the decision as to whether the data should be accepted or rejected. However, some delay is inherent in the circuitry in the chamber 11, so that frequently no special additional delay means is necessary.

Considering now the novel means by which gate circuit 13 is operated, a pair of scintillators 14 and 16 are disposed at the trajectory 17 along which charged particles reach the scattering chamber 11. Light produced by the particle in the scintillators 14 and 16 is detected by first photomultiplier tube 18 and second photomultiplier tube 19 respectively. A resultant output pulse 51 from the first photomultiplier 18 is coupled to a pulse shaper 21 wherein the pulse 51 is shaped into a rectangular pulse 52 of uniform length, the pulse shaper typically being of the type utilizing a shorted transmission line to provide the shaping. The waveform of photomultiplier output pulse 51 is thus changed to pulse shaper pulse 52 which has a fixed duration but an amplitude proportional to that of photomultiplier pulse 51.

The pulse shaper 21 output pulse 52, is applied to each of four paralleled delay lines 22, 23, 24 and 26 by a distribution circuit 27. Delay line output pulses 53, 54, 56 and 57 from the delay lines 22, 23, 24 and 26 respectively are added together in a mixer 28, producing a mixer output waveform 58 which has a length equal to four times that of pulse shaper output pulse 52. First delay line 22 is a short section of a coaxial line with practically no delay. The second delay line 23 is longer than first delay line 22 by an amount necessary to produce a delay equal to the duration of pulse output shaper pulse 21. Similarly, third delay line 24 is sufficiently longer than second delay line 23 to produce an additional delay equal to the duration of pulse shaper output pulse 21. Fourth delay line 26 is correspondingly longer than third delay line 24. Thus as pulse 53 is ending at the input of mixer 28, pulse 54 is arriving on the next longer delay line, etc., and the mixer output pulse 58 is formed.

An output pulse 59 from the second photomultiplier tube 19 is coupled to a pulse shaper 29, identical to pulse shaper 21, providing a second pulse shaper pulse 61 identical to first pulse shaper pulse 51. Pulse shaper 29 is coupled to a distribution circuit 31, delay lines 32, 33, 34 and 36 and mixer 27 in a manner identical to the corresponding connections described above, thereby providing a second mixer output pulse 62 similar to first mixer output pulse 58.

The output signals from the mixers 28 and 37 are coupled to the two inputs of a coincidence circuit 38. The coincidence circuit 38 is of the class which utilizes a first and a second PNP transistor 91 and 92 in a common collector "long tail pair" with the output taken from the emitter. In this class of coincidence circuit the output level cannot exceed the lowest input level.

First and second input capacitors 93 and 94 are connected from the outputs of the mixers 28 and 37 to the bases of the coincidence circuit transistors 91 and 92 respectively. The base of each transistor 91 and 92 is biased at a fixed operating voltage by first and second resistive voltage dividers 96 and 97 respectively, connected between a positive power supply terminal 98 and a negative power supply terminal 99. The collectors of both transistors 91 and 92 are connected to negative power supply terminal 99 while the emitters of the transistors are connected through a common load resistor 101 to the positive power supply terminal 98.

The transistors 92 and 91 are normally conducting. When a positive pulse is applied to the base of one of the transistors, the current through the other transistor will increase to maintain an essentially constant total current through the emitter resistor 101, thus no output signal is produced. If pulses are applied to the bases of both transistors, the currents through both transistors are reduced. The transistor with the lowest amplitude input pulse will have the highest current, thus controlling the potential developed across the emitter resistor 101 and thereby the amplitude of the output pulse. An output capacitor 102 is connected from the emitters of the transistors 91 and 92 to an amplitude discriminator 39, coupling an output pulse 63 from the coincidence circuit 38 to the amplitude discriminator. The discriminator circuit 39 has a threshold level which requires that input signals be above a pre-selected minimum potential before such pulses are coupled therethrough to a control input 41 of the previously described gate circuit 11. With the type of signals exemplified by photomultiplier output signals 51 and 59, no signal is passed through the discriminator 39, as indicated by waveform 64. Thus the previously described signals from the scattering chamber 11 are applied to data storage circuitry 12 through the normally closed gate circuit 13.

However, if a coincidence circuit output pulse exceeds the threshold level of the discriminator 39 and is thus applied to the gate circuit 13, the opened gate circuit will not pass data from the chamber 11 to the storage circuit 12.

Considering now the operation of the invention under normal conditions, assume that a charged particle passes through the first and second detectors 14 and 16 and that a corresponding voltage pulse 51 and 59 is created in each of the photomultiplier tubes 18 and 19. Pulse shaper output pulses 52 and 61 of uniform duration are created at the outputs of the shapers 21 and 29. The shaper output pulses 52 and 61 are further accurately lengthened without loss of definition by delay lines 22, 23, 24, 26 and 32, 33, 34, 36 as previously discussed. Mixer output pulses 58 and 62 are formed at the outputs of both mixers 28 and 37 by combining the delay line output pulses. An output pulse 63 from a coincidence circuit 38 is created, such pulse having an amplitude equal to the amplitude of the lowest of the two input pulses 62 and 58. The threshold level of the amplitude discriminator 39 is set so that when such a coincidence output signal 63 is received, no signal is passed therethrough to the gate circuit 11 and the data from the chamber 11 is stored in the recording circuit 13.

Assume now a second situation wherein a charged particle is received as before. A few microseconds later, before the data from the first particle is assimilated and stored, a second charged particle is detected by the photomultipliers 18 and 19, producing a second set of input pulses as shown by photomultiplier waveforms 66 and 67. The input pulses are shaped in the pulse shapers 21 and 29 as indicated by waveforms 68 and 69. The shaped pulses are lengthened in the delay lines and combined in the mixers 28 and 37 to provide waveforms 71 and 72 wherein the lengthened first pulse overlaps the second pulse, such waveforms 71 and 72 being approximately doubled in amplitude during such overlap period. Such pulses 71 and 72 pass through the coincidence circuit 38 as indicated by coincidence circuit output waveform 73. The threshold level of the amplitude discriminator 38 is exceeded during the peak amplitude period of waveform 73 and an output pulse 74 is applied to the gate circuit 13. Accordingly, signals from the scattering chamber 11 are not received by the data recording circuit 12 and the storage of misleading data resulting from mixture of datum from two closely spaced particles is avoided.

Considering now a third possible condition, assume that a single charged particle activates the detectors 14 and 16, but owing to statistical probabilities the photomultiplier tube 19, for instance, forms a pulse 76 with an amplitude double the average amplitude while the other photomultiplier tube 18 provides a pulse 77 of normal amplitude. Thus, the amplitude of the resultant pulse 78 from the pulse shaper 29 has twice the amplitude of the corresponding pulse 79 from the pulse shaper 21. Correspondingly, the amplitude of the resultant pulse from the mixer 37 is an extended rectangular pulse 81 with an amplitude twice that of the concurrent output pulse 82 from mixer 28. However, since the resultant output signal 83 from the coincidence circuit 38 cannot have an amplitude exceeding that of the lowest amplitude input signal, the output amplitude of such signal 83 corresponds to that of the lower amplitude input pulse 82. Since the amplitude of the coincidence circuit signal 82 is normal for a single charged particle the amplitude discriminator circuit 39 does not pass such pulse, as shown by curve 84. While it is possible that double sized pulses from a single particle could be formed in both detectors 14 and 16, such occurrence is statistically improbable, however, such a pulse would cause inactivation of the data storage circuit 12.

It will be apparent that additional delay lines may be included between the distribution circuit 27 and mixer 28 if a more extended protection period is desired. As described, the incremental differences in delay times of the delay lines in each set is equal to the length of input pulses. However, it is possible, if some degradation of reliability can be accommodated, to increase such incremental difference up to twice the length of an input pulse and still obtain the same general type of operation as described.

Thus while the invention has been disclosed with respect to a specific embodiment, it will be apparent to those skilled in the art that numerous variations and modifications may be made within the spirit and scope of the invention and it is not intended to limit the invention except as defined in the following claims.

What is claimed is:

1. In a circuit for preventing signals from a charged particle sensitive apparatus from being received by an associated particle registering device when successive charged particles enter said apparatus within a time interval less than that required for said registering device to distinguish between said successive particles, the combination comprising a normally closed gating means for transmitting signals from said apparatus to said registering device, a first and second charged particle detector disposed in the path of particles entering said apparatus and producing separate output pulses in response to said particles, a first and second pulse stretcher receiving said output pulses from said first and second detectors respectively and producing stretched pulses of uniform duration from said output pulses, a coincidence circuit having a pair of pulse input means each receiving said stretched pulses from a separate one of said pulse stretchers and producing an output signal upon the receipt of concurrent input signals, said coincidence circuit being of the class producing an output signal having an amplitude proportional to that of the smallest of said concurrent input signals, and an amplitude detecting means coupled between said coincidence circuit and said gating means for temporarily opening said gating means when the amplitude of the output signal from said coincidence circuit exceeds the amplitude level resulting from activation of said charged particle detectors by a single one of said charged particles.

2. A circuit as described in claim 1 wherein said pulse stretchers are of the class which extend pulses to a length at least equal to said time interval.

3. In a pulse circuit for controlling a normally closed gate circuit which transmits signals from a charged particle sensitive apparatus to a data processing device, the combination comprising a first and a second particle detector disposed along the path of charged particles entering said apparatus each said detector producing an output pulse in response to detected charged particles, a first and a second group of parallel connected delay lines the delay lines in each group simultaneously receiving said output pulses from said first and second particle detectors respectively, the delay lines in each of said groups having progressively longer delay times, a first and a second mixer connected to the outputs of said first and said second groups of delay lines respectively and combining pulses from each of said groups into a composite pulse of uniform duration, a coincidence circuit of the class producing output signals which have amplitudes proportional to that of the lowest amplitude input signal, said coincidence circuit receiving the outputs of said first and second mixers, and an amplitude discriminator of the class passing only signals exceeding a predetermined amplitude level equal to that resulting from activation of said particle detectors by a single one of said charged particles, said discriminator being coupled between the output of said coincidence circuit and said gate circuit whereby said gate circuit is opened when a pulse from said coincidence circuit exceeds said predetermined level.

4. A pulse circuit as described in claim 3 wherein said first and second particle detectors are each comprised of a scintillator and a photomultiplier tube viewing said scintillator.

5. In a circuit for preventing signals from a charged particle sensitive apparatus from being processed by an associated data storage device when successive charged particles enter said apparatus within an interval less than that required for said storage device to process a first of said signals, the combination comprising a gate circuit coupled between said apparatus and said storage device, a first and a second particle detector disposed at the path along which particles enter said apparatus and producing electrical pulses in response thereto, a first and second pulse shaper coupled to said first and second particle detectors respectively and of the type shaping said electrical pulses to form rectangular pulses, a first and a second distribution circuit coupled to said first and second pulse shapers respectively and receiving said rectangular pulses therefrom and simultaneously distributing said rectangular pulses at a plurality of output terminals, a first and second set of delay lines coupled to said output terminals of said first and second distribution circuit respectively, each of said sets being comprised of a plurality of parallel connected progressively longer delay lines, a first and a second mixer connected to the outputs of said first and second sets of delay lines respectively and combining the output signals therefrom, a coincidence circuit having two inputs coupled to the outputs of said first and second mixers respectively and of the class producing an output signal proportional to the amplitude of the lowest amplitude input pulse, and an amplitude detector having an input coupled to the output of said coincidence circuit and an output controlling said gate circuit, said amplitude detector being responsive to input signals exceeding the amplitude level associated with detection of a single charged second particle by said first and said particle detectors, whereby data is prevented from entering said data storage device when successive charged particles enter said charged particle sensitive apparatus within a time interval less than the data processing time of said data storage device.

6. In a pulse control circuit for preventing signals from a charged particle detecting apparatus from being recorded by a data storage device when a plurality of input particles enter said apparatus within a minimum time period, the combination comprising a first and a second charged particle detector disposed along the path of particles entering said apparatus, a first and a second pulse shaper coupled to the outputs of said first and said second particle detectors respectively, said first and said second pulse shapers being of the class converting input pulses into output pulses of uniform duration, a first and a second distribution circuit coupled to the outputs of said first and second pulse shapers respectively and each having a plurality of output terminals providing simultaneous output pulses corresponding to an input pulse, a first and a second set of delay lines each connected to said output terminals of a separate one of said distribution circuits, the individual delay lines in each said set having progressively longer delay times which differ by an amount at least equal to the duration of output pulses at said first and second pulse shapers, a first mixer circuit combining the outputs of said first set of delay lines and a second mixer circuit combining the outputs of said second set of delay lines each said mixer combining said delay line outputs into composite pulses, a coincidence circuit having a pair of inputs each coupled to the output of a separate one of said mixers and of the class having an output amplitude proportional to the amplitude of the lowest amplitude of applied input pulses, a high pass amplitude discriminator connected to the output of said coincidence circuit and passing only pulses having an amplitude exceeding a preselected level, such level being equal to the amplitude of output signals from said coincidence circuit resulting from detection of a single charged particle by said charged particle detectors, and disabling means connected to temporarily deactivate said data storage device upon receipt of a signal from said discriminator.

7. A pulse control circuit as described in claim 6 wherein said coincidence circuit is of the long tail pair class.

8. In a circuit for preventing erroneous signals from a charged particle analyzing apparatus from being stored in a data memory, the combination comprising a first and a second particle detector responsive to passage of charged particles into said analyzing apparatus producing a detector output pulse as a result thereof, a first and a second pulse shaper connected to said first and second particle detectors respectively and providing output signals of uniform duration from said detector pulses, a first and a second pulse distribution circuit connected to the outputs of said first and second pulse shapers respectively and each providing multiple output signals reproducing applied input signals, a first and a second set of delay lines connected to said first and second pulse distribution circuits respectively, each of said sets having a plurality of parallel delay lines with progressively longer delay times and providing a stretched rectangular pulse, the delay times of successive ones of said delay lines differing by an interval which is within the range of from one to two times the duration of output pulses from said pulse shaper, a first and a second mixer connected to said first and said second sets of delay lines respectively, a coincidence circuit having inputs connected to said first and second mixers which coincidence circuit is of the class providing an output signal having an amplitude equal to the amplitude of the lowest applied input signal, an amplitude discriminator connected to the output of said coincidence circuit and providing an output signal in response to signals from said coincidence circuit exceeding a preselected level, said level being equal to the amplitude of output signals from said coincidence circuit resulting from detection of a single charged particle by said charged particle detectors, and gate means inactivating said data memory upon receipt of a signal from said discriminator.

References Cited by the Examiner
UNITED STATES PATENTS

| | | | |
|---|---|---|---|
| 2,830,187 | 4/58 | Scherbatskoy | 250—71.5 |
| 3,071,689 | 1/63 | Scherbatskoy | 250—71.5 |
| 3,080,482 | 3/63 | Scherbatskoy | 250—71.5 |

RALPH G. NILSON, *Primary Examiner.*